United States Patent
Yamaguchi

[19]

[11] Patent Number: 6,038,069

[45] Date of Patent: Mar. 14, 2000

[54] REAL IMAGE TYPE ZOOM FINDER

[75] Inventor: Susumu Yamaguchi, Hachioji, Japan

[73] Assignee: Konica Corporation, Tokyo, Japan

[21] Appl. No.: 09/097,742

[22] Filed: Jun. 16, 1998

[30] Foreign Application Priority Data

Jun. 18, 1997 [JP] Japan ..................................... 9-161236

[51] Int. Cl.$^7$ ............................ G02B 23/00; G02B 15/14
[52] U.S. Cl. ............................ 359/432; 359/422; 359/431
[58] Field of Search ............................ 359/362, 420–422, 359/431–433, 676–678, 686; 396/373–386

[56] References Cited

U.S. PATENT DOCUMENTS

| | | | |
|---|---|---|---|
| 4,926,201 | 5/1990 | Mukai et al. ............................ | 396/384 |
| 5,144,349 | 9/1992 | Kato et al. ............................... | 396/385 |
| 5,231,534 | 7/1993 | Kato ........................................ | 359/431 |
| 5,323,264 | 6/1994 | Kato ........................................ | 359/431 |
| 5,717,521 | 2/1998 | Kim ......................................... | 359/432 |
| 5,757,543 | 5/1998 | Ogata ...................................... | 359/422 |
| 5,784,204 | 7/1998 | Kang ....................................... | 359/432 |
| 5,815,312 | 9/1998 | Takato ..................................... | 359/432 |
| 5,889,620 | 3/1999 | Furuta ..................................... | 359/432 |

FOREIGN PATENT DOCUMENTS 8-234103 9/1996 Japan .
8-248315 9/1996 Japan .

*Primary Examiner*—Thong Nguyen
*Attorney, Agent, or Firm*—Finnegan, Henderson, Farabow, Garrett & Dunner, L.L.P.

[57] ABSTRACT

A real image type zoom finder includes: an objective lens having a plurality of lenses, having a positive refracting power; a field diaphragm provided in the vicinity of a focal point of the objective lens, for defining a viewing field; a structure for erecting an image formed by the objective lens; and an eyepiece having a positive refracting power for enlarging an image formed by the objective lens and the field diaphragm. The objective lens includes at least a first lens group provided closest to an object side, having a negative refracting power, and satisfies the following conditions:

$$1.9 < f_B/f_W \text{ and}$$

$$1.0 < |f_1|/f_W < 2.0$$

where $f_B$ represents a minimum value of a distance between a surface of the object lens closest to a pupil side and the field diaphragm, which is equivalent to a corresponding air gap, $f_1$ represents a focal length of the first lens group, and $f_W$ represents a focal length at a wide angle end of the objective lens.

4 Claims, 17 Drawing Sheets

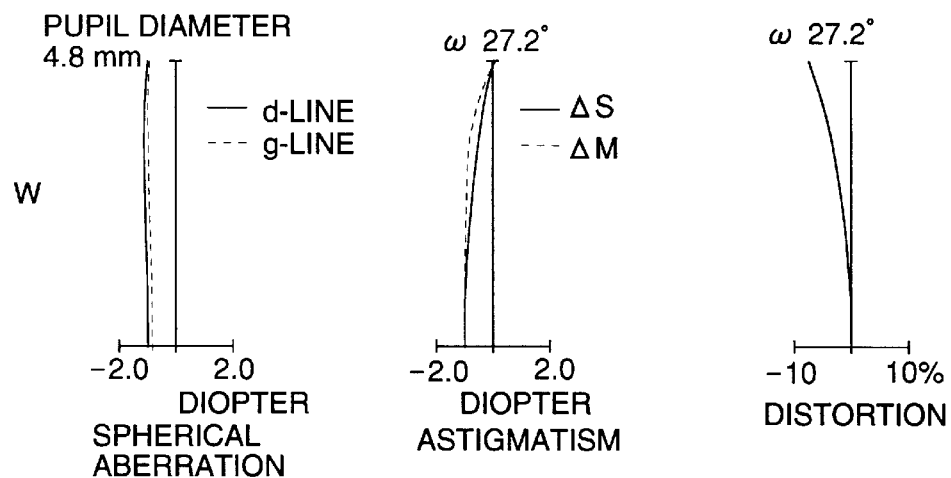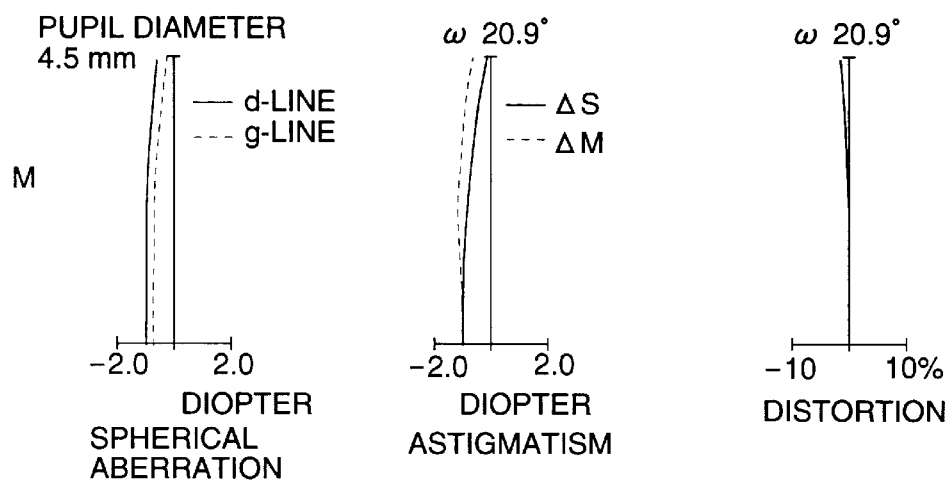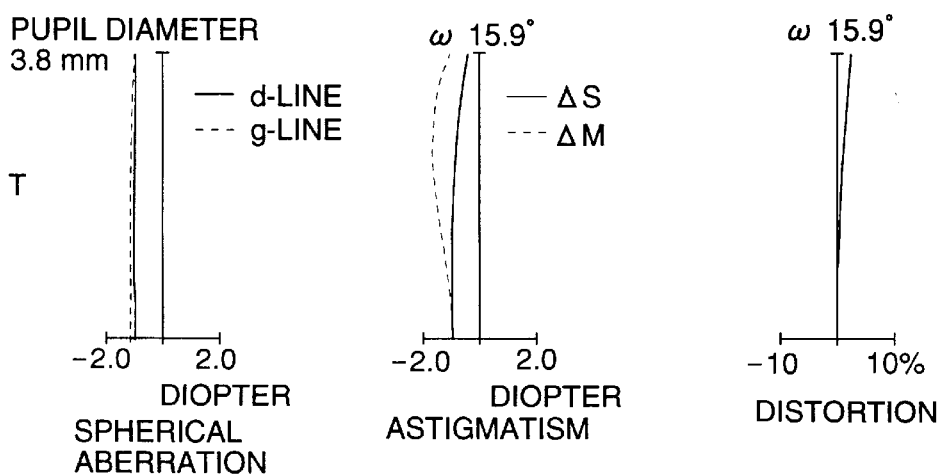

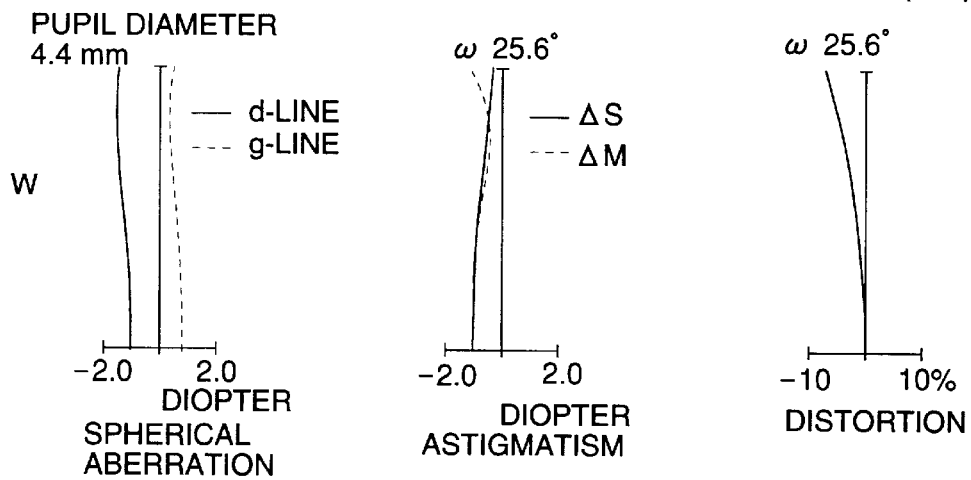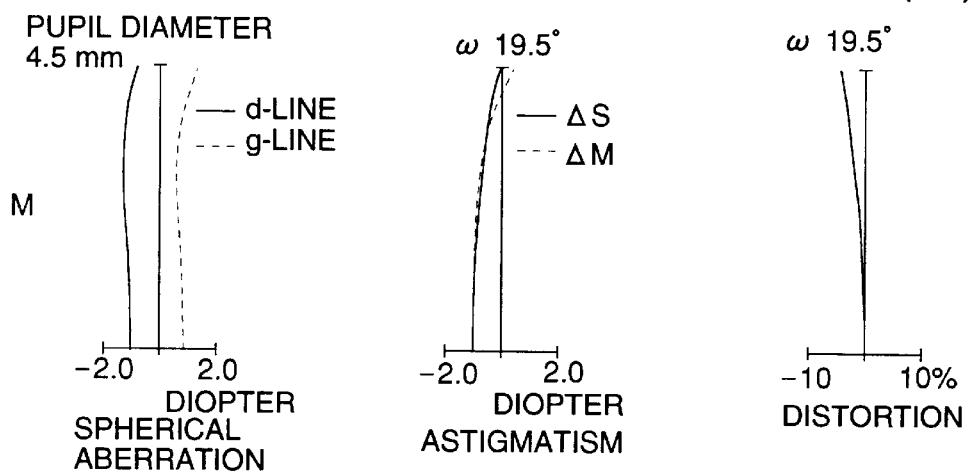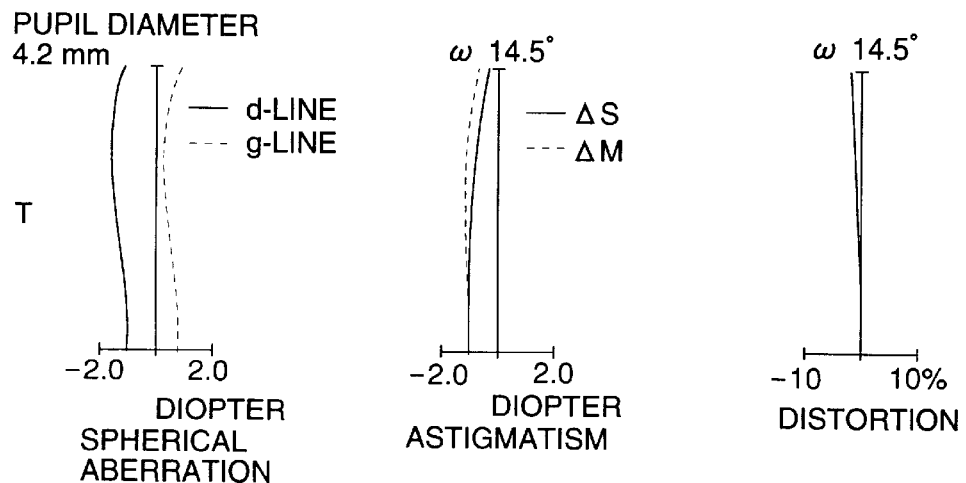

REAL IMAGE TYPE ZOOM FINDER

BACKGROUND OF THE INVENTION

The present invention relates to a real image type zoom finder used for a viewfinder of a camera, specifically to a real image type zoom finder which can secure a large back focal length of an objective lens though it is compact.

Recently, the real image type zoom finder is widely used as a zoom finder because its variable magnification ratio can be easily increased and it is advantageous in clearness of a field diaphragm, comparing to a virtual image type one. In a real image type zoom finder, an image erecting member for erecting an object image is necessary, therefore, a real image type zoom finder which is compact and has a long back focal length of an objective lens, is required for arrangement of an image erecting member.

As an objective lens of the real image type zoom finder, an objective lens having a structure in which at least 2 lens groups are moved for correcting a change of diopter during a magnification varying operation, is widely used. The objective lens having more than 2 moving groups, is divided into an objective lens having a structure in which a lens group closest to the object is moved, and an objective lens having other structures. An objective lens having a structure in which a lens group closest to the object is moved, is not preferable because dusts easily enter a viewfinder structurally. Further, in order to appropriately secure a back focal length of the objective lens, it is desirable to position a lens group having negative refractive power at a position closest to the object side of the objective lens.

In order to satisfy these requirements, examples of the real image type zoom finder having an object lens, which is composed of at least 3 lens groups of a fixed lens group having negative refractive power at a position closest to an object side, and 2 lens groups movable during a magnification varying operation, and in which a back focal length is comparatively long, are disclosed in Japanese Patent Publication Open to Public Inspection Nos. 234103/1996, 248315/1996, etc. In these conventional examples, as a back focal length of the objective lens, a sufficient space can be secured for 2 reflection surfaces of a roof mirror or a Porro prism, although magnification of a viewfinder is 0.4 at a wide angle end.

However, recently, while size reduction of overall camera is intended, a requirement for a real image type zoom finder is increased in which a larger back focal length of an objective lens can be secured, for example, by means of a method in which a reflection element having 3 reflection surfaces is arranged between an objective lens and a field diaphragm, for a convenience of arrangement of other parts.

SUMMARY OF THE INVENTION

An object of the present invention is to solve such a problem. That is, the object of the present invention is to provide a real image type zoom finder in which a large back focal length of an objective lens can be secured, while a comparatively large magnification is maintained at a wide angle end.

The object of the present invention can be attained by the following means.

A real image type zoom finder comprising, an objective lens composed of a plurality of lenses and having positive refractive power; a field diaphragm arranged in the vicinity of a focal point of the objective lens; an image erecting member for erecting an object image; and an eyepiece having positive refractive power to enlarge the image viewed though the objective lens and the field diaphragm, wherein the objective lens has at least a first lens group having negative refractive power, disposed at a position closest to the object side, and satisfies the following conditions, $$1.9 < f_B/f_W \tag{1}$$

$$1.0 < |f_1|/f_W < 2.0 \tag{2}$$

where, $f_B$: the minimum value of a distance equivalent to an air distance from the surface closest to a pupil side of the objective lens to the field diaphragm, $f_1$: a focal length of the first lens group, and $f_W$: a focal length at a wide angle end of the objective lens.

In this connection, a distance equivalent to an air distance implies a total (d/n) of values in which a distance d is divided by a refractive index n of a medium through which light passes (in air, n=1).

BRIEF DESCRIPTION OF THE DRAWINGS

FIGS. 1(a), 1(b), and 1(c) are sectional views of a real image type zoom finder of Example 1;

FIGS. 2(a)-1 to 2(c)-3 are views of aberration of the real image type zoom finder of Example 1;

FIGS. 3(a), 3(b), and 3(c) are sectional views of a real image type zoom finder of Example 2;

FIGS. 4(a)-1 to 4(c)-3 are views of aberration of the real image type zoom finder of Example 2;

FIGS. 6(a)-1 to 6(c)-3 are views of aberration of the real image type zoom finder of Example 3;

FIGS. 10(a)-1 to 10(c)-3 are views of aberration of the real image type zoom finder of Example 4;

FIGS. 12(a)-1 to 12(c)-3 are views of aberration of the real image type zoom finder of Example 5;

FIGS. 14(a)-1 to 14(c)-3 are views of aberration of the real image type zoom finder of Example 6;

FIGS. 16(a)-1 to 16(c)-3 are views of aberration of the real image type zoom finder of Example 7;

DETAILED DESCRIPTION OF THE PREFERRED EMBODIMENT

Figure 1:
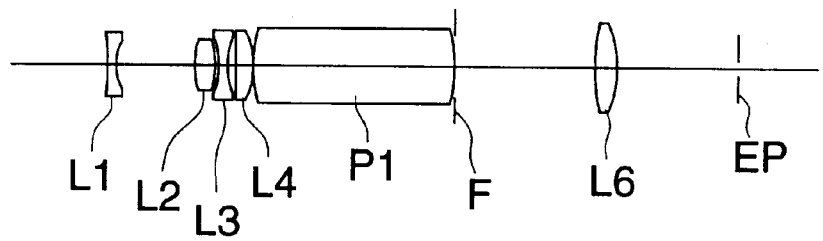
Figure 1:
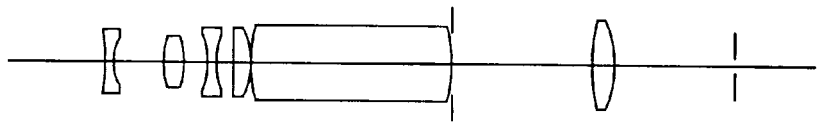
Figure 1:
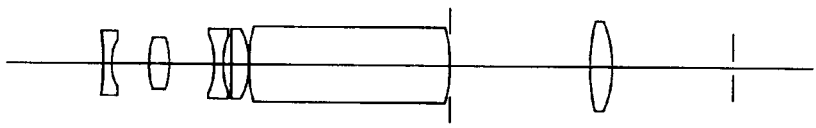

Herein, an operation of the real image type zoom finder of the present invention will be described below.

When an objective lens is structured such that it has the first lens group having negative refracting power and the second lens group having positive refracting power in the order from the object side, the back focal length can easily be secured in the structure, which is the object of the present invention, and even if field angle is increased, a diameter of a front lens is not so increased, therefore, the structure is desirable for reduction of the overall size.

Further, when the third lens group having negative or positive refractive power is additionally provided in the structure, and the objective lens varies magnification from a wide angle end to a telephoto end by moving the second lens group and third lens group in the direction of the optical axis, a diopter in which the diopter is not changed during magnification change can be obtained.

Next, the above-described conditional relationship will be described.

The conditional relationship (1) shows a condition of the real image type finder in which a back focal length of the objective lens is long, and the present invention provides a real image type zoom finder which can satisfy the conditional relationship.

The conditional relationship (2) regulates the refractive power of the first negative lens group composed of a single lens. When the calculated value exceeds the upper limit and the refractive power of the first lens group is reduced, it is difficult to secure a necessary back focal length. When the calculated value exceeds the lower limit and the refractive power of the first lens group is increased, although the back focal length can easily be secured, generation of aberration becomes conspicuous in this group, and correction in other groups is difficult. In this connection, it is more desirable to satisfy the following relationship.

$$1.0 < |f_1|/f_W < 1.8 \quad (2)'$$

Further, in a zoom finder in which a variable magnification ratio is up to approximately 2 times, the refractive power of the first negative lens is regulated by the following conditional relationship instead of the relationship (2):

$$1.8 < |f_1| \cdot Z/f_W < 3.0 \quad (2)''$$

where, Z (magnification ratio)=$f_t/f_W$, and $f_t$: a focal length of the objective lens at a telephoto end.

Meanings of the upper limit and lower limit of the conditional relationship are the same as those in the relationship (2). That is, when the calculated value exceeds the upper limit, it is difficult to secure a back focal length, and when the calculated value exceeds the lower limit, generation of aberration in the first lens group becomes conspicuous.

Further, when the zoom finder of the present invention secondarily satisfies the following condition, the size of the overall finder can be reduced.

$$2.0 < D/f_W < 3.2 \quad (3)$$

where, D: the maximum thickness on axis of the objective lens (a distance from the surface closest to the object side to the surface closest to the pupil side) $f_W$: a focal length of the objective lens at a wide angle end.

The relationship (3) shows conditions to appropriately set the maximum thickness on axis of an objective lens. When the calculated value exceeds the upper limit and the thickness on axis of the objective lens is increased, the compactness is deteriorated. When the calculated value exceeds the lower limit and the thickness on axis of the objective lens is reduced, the refractive power of each lens group is increased and it is difficult to finely correct various aberrations. Further, deterioration of aberration when eccentricity of the lens becomes conspicuous, therefore, requirement of accuracy during assembling of the viewfinder becomes severe.

Incidentally, the more desirable structure of the real image type zoom finder of the present invention is as follows. The objective lens is structured from the object side in the order of the first lens group having the negative refracting power, the second lens group having the positive refracting power, the third lens group having the negative refracting power, and the fourth lens group having the positive refracting power, and the magnification varying operation from the wide angle end to the telephoto end is conducted by moving the second and the third lens groups in direction of the optical axis. When the overall objective lens is structured by 4 lens groups, a variation of aberration during the magnification varying operation is smaller, and a viewfinder forming more sharp image in the overall variable magnification range can be obtained, as compared with the structure of 3 lens groups. Further, when each lens group is composed of a single lens, the thickness on axis of the objective lens can be suppressed to be smaller.

A function of an objective lens of 4 group composition will be described below.

In order to securely obtain a back focal length to satisfy the conditional relationship (1) of the present invention, strong negative refractive power is needed for the first negative lens group. When the first lens group is composed of a single lens, the negative meniscus shape with the convex surface facing the object side is preferable for increasing the wide angle property. However, when the radius of curvature of the first lens on the pupil side is too small, the aberration of higher order is generated, or production is difficult, therefore, a precaution is necessary. Accordingly, when an angle of view is not so large at the wide angle end, it is desirable that the first negative lens has the biconcave shape. In order to correct the strong negative distortion, it is preferable that at least one surface of the first lens has the aspherical surface in which the negative refracting power becomes smaller as a position is closer to the periphery.

Further, in the objective lens of 4 group composition of the present invention, as the variable magnification ratio of the viewfinder is increased, the refractive power of the second positive lens group which bears a major portion of the magnification varying operation, becomes large. Accordingly, when the second lens group is composed of a single lens, the lens is a biconvex lens so that the positive refractive power is allotted to the object side and the pupil side, and thereby, generation of various aberrations can be suppressed to the minimum. Further, when at least one surface is the aspherical surface in which the positive refractive power becomes smaller as a position is closer to the periphery, the spherical aberration or coma can be finely corrected.

The third lens group having the negative refractive power mainly bears a function to correct a change of diopter, and further, it is effective for correction of the distortion which tends to become negative largely at the wide angle end, and also for correction of the astigmatism. In this connection, it is preferable that the refractive power of the third lens group secondarily satisfies the following conditional relationship:

$$0.8 < |f_3|/f_2 < 1.4 \quad (4)$$

where, $f_3$: the focal length of the third lens group, and
$f_2$: the focal length of the second lens group.

When the calculated value exceeds the upper limit of the conditional relationship (4) and the refractive power of the third negative lens group becomes small, it is difficult to secure the sufficient back focal length of the objective lens, and further an effect of correction of the negative distortion, or the like, at the wide angle end becomes small, which is not preferable. Further, an amount of movement of the third lens group for correction of the diopter also becomes large. When the calculated value exceeds the lower limit and the refractive power of the third lens group becomes large, generation of various aberrations in this group becomes frequent, and it is difficult to finely correct the aberration in overall variable magnification range.

In the case where a prism constituting the image erecting member is arranged on the pupil side of the fourth lens group having the positive refractive power, when the incident surface of the prism is the surface having the positive refractive power, correction of aberration of the spherical aberration or the like, can be allotted to the fourth lens group. Further, when the aspherical surface is adopted also for the third and fourth lens groups, the degree of freedom for correction of aberration is increased, and thereby, a viewfinder which has the small aberration, can be obtained.

In this connection, when an image erecting member positioned more closely to the object side than to a field diaphragm, has the refracting power, the above-described $f_W$ and $f_t$ are defined as the composite focal length of the objective lens and the image erecting member closer to the object side than to a field diaphragm.

Examples of a real image type zoom finder of the present invention will be described below. Symbols in each Example have the following meanings.

ω: a half field angle
r: the radius of curvature of the surface
d: an interval between surfaces on the axis
$n_d$: the refractive index with respect to the d line
$v_d$: an Abbe's number Further, the shape of the aspherical surface (the surface of * mark) of the present invention is expressed by the following numerical expression when the apex curvature is C, a conical constant is K, and an aspherical coefficient is Ai (i=4, 6, 8) in the orthogonal coordinate system in which an apex of the surface is the origin and the direction of the optical axis is X axis:

$$X = \frac{ch^2}{1 + \sqrt{1 - (1 + K) c^2 h^2}} + A_4 h^4 + A_6 h^6 + A_8 h^8 + \ldots$$

$$h = \sqrt{Y^2 + Z^2}$$

EXAMPLE 1

Table 1 and Table 2 are lens data of Example 1, FIGS. 1(a), 1(b), 1(c) respectively show a sectional view of the viewfinder at the wide angle end, medium range, and telephoto end and FIGS. 2(a)-1 to 2(a)-3, 2(b)-1 to 2(b)-3, 2(c)-1 to 2(c)-3, are views respectively showing aberration curves at wide angle end, medium range, and telephoto end.

ω(°): 27.2 - 20.9 - 15.9

Magnification of the viewfinder: 0.43 - 0.57 - 0.77

TABLE 1

| Surface No. | r | d | $n_d$ | $v_d$ |
|---|---|---|---|---|
| 1 | −50.909 | 1.20 | 1.58300 | 30.0 |
| 2* | 6.600 | 9.80–6.00–4.56 | | |

TABLE 1-continued

| Surface No. | r | d | $n_d$ | $v_d$ |
|---|---|---|---|---|
| 3* | 7.774 | 2.30 | 1.49200 | 57.0 |
| 4 | −8.766 | 0.50–3.11–5.74 | | |
| 5 | −10.179 | 1.20 | 1.58300 | 30.0 |
| 6* | 9.810 | 1.00–2.19–1.00 | | |
| 7 | 60.445 | 2.20 | 1.49200 | 57.0 |
| 8* | −7.599 | 0.20 | | |
| 9 | 18.000 | 25.00 | 1.52607 | 56.0 |
| 10 | −18.000 | 17.60 | | |
| 11* | 22.430 | 2.50 | 1.49200 | 57.0 |
| 12 | −15.403 | 15.00 | | |
| 13(eye point) | | | | |

TABLE 2

| Aspherical coefficients of the 2nd surface | Aspherical coefficients of the 8th surface |
|---|---|
| K = −1.08000 × 10⁻¹<br>A4 = −3.91090 × 10⁻⁴<br>A6 = 1.52290 × 10⁻⁵ | K = −3.82100 × 10⁰<br>A4 = −8.77600 × 10⁻⁴<br>A6 = 1.10930 × 10⁻⁵ |
| Aspherical coefficients of the 3rd surface | Aspherical coefficients of the 11th surface |
| K = −4.17230 × 10⁻³<br>A4 = −7.47170 × 10⁻⁴<br>A6 = −2.73240 × 10⁻⁷ | K = −1.02000 × 10¹<br>A4 = −9.25540 × 10⁻⁵<br>A6 = 2.95750 × 10⁻⁷<br>A8 = −1.47580 × 10⁻⁹ |
| Aspherical coefficients of the 6th surface | |
| K = 7.85570 × 10⁻²<br>A4 = −2.39020 × 10⁻⁴<br>A6 = −5.81370 × 10⁻⁶ | |

The objective lens is composed of the first biconcave negative lens L1, the second biconvex positive lens L2, the third biconcave negative lens L3, and the fourth biconvex positive lens L4, and an image through the objective lens is formed in the vicinity of the surface of emergence of a prism P1. The incident surface of P1 is structured by the spherical surface so that it bears a portion of positive refractive power together with L4, and its surface of emergence carries out also the role of a condenser lens. Further, when the magnification is changed from the wide angle end to the telephoto end, L1 and L4 are fixed, L2 is monotonously moved to the object side, and L3 is reciprocated. The lens L2 bears a most part of the magnification operation, and L3 bears mainly the image plane correction. L6 is an eyepiece, F is a field diaphragm and EP is an eye point.

The image erecting member is composed of the prism P1 having 3 reflection surfaces and a reflection mirror (not shown) located between P1 and L6.

EXAMPLE 2

Figure 3:
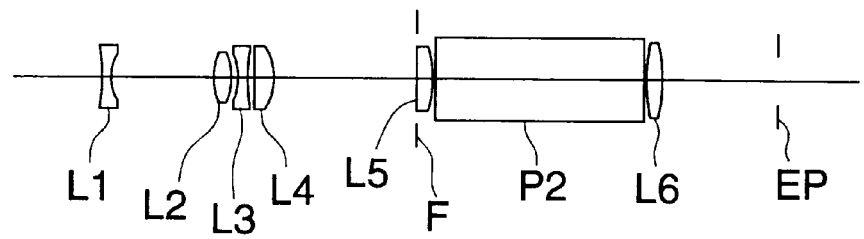
Figure 3:
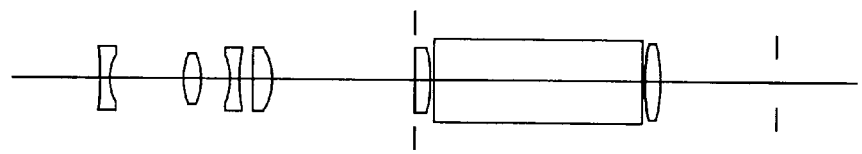
Figure 3:
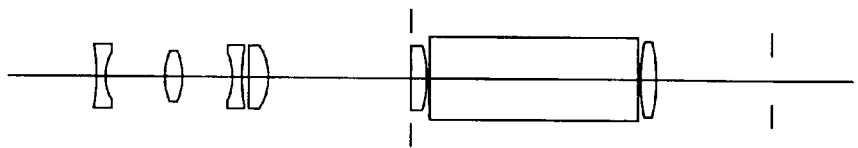
Figures 1, 2, 3, 4A:
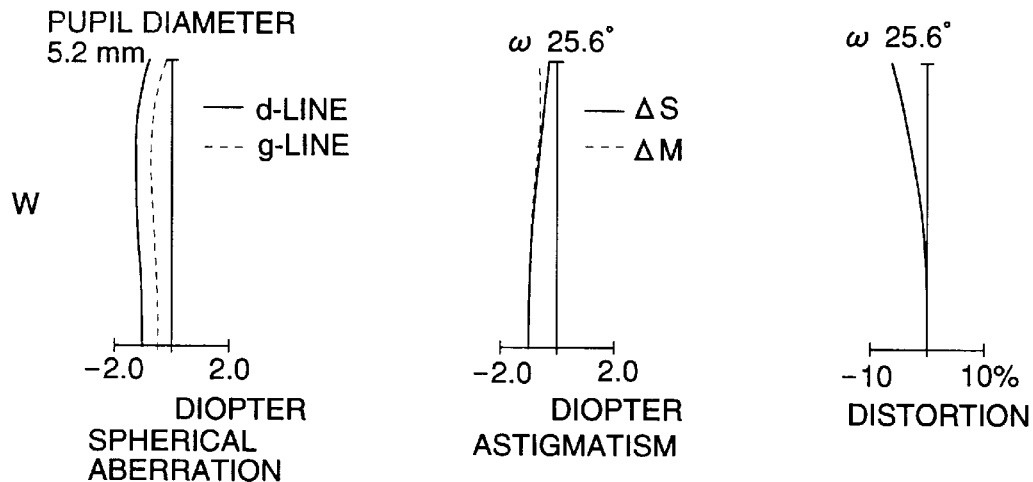
Figures 1, 2, 3, 4B:
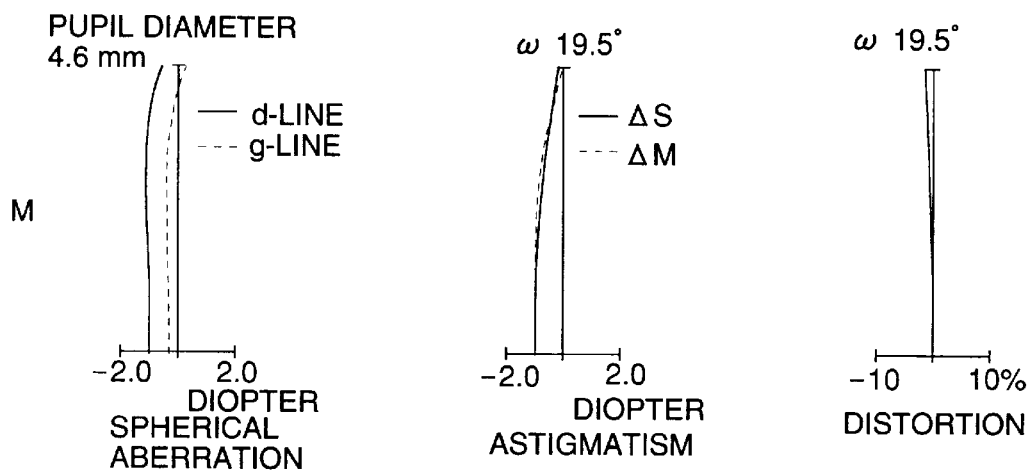
Figures 1, 2, 3, 4C:
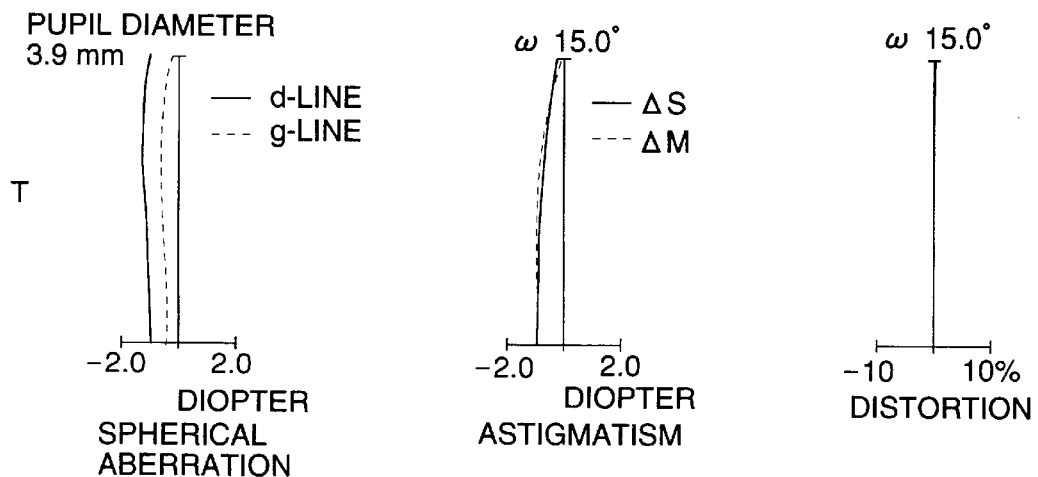

Table 3 and Table 4 are lens data of Example 2, FIGS. 3(a), 3(b), 3(c) respectively show a sectional view of the viewfinder at the wide angle end, medium range, and telephoto end, and FIGS. 4(a)-1 to 4(a)-3, 4(b)-1 to 4(b)-3, 4(c)-1 to 4(c)-3, are views respectively showing aberration curves at the wide angle end, medium range, and telephoto end.

ω(°): 25.6 - 19.5 - 15.0

Magnification of the viewfinder: 0.39 - 0.52 - 0.69

TABLE 3

| Surface No. | r | d | $n_d$ | $v_d$ |
|---|---|---|---|---|
| 1 | −33.942 | 1.20 | 1.58300 | 30.0 |
| 2* | 6.600 | 13.20–9.58–7.34 | | |
| 3* | 9.207 | 2.20 | 1.49200 | 57.0 |
| 4 | −9.800 | 0.80–3.53–6.66 | | |
| 5 | −10.055 | 1.20 | 1.58300 | 30.0 |
| 6 | 27.907 | 1.20–2.09–1.20 | | |
| 7* | −50.147 | 2.20 | 1.49200 | 57.0 |
| 8 | −6.241 | 18.50 | | |
| 9 | ∞ | 1.80 | 1.49200 | 57.0 |
| 10 | −15.300 | 0.50 | | |
| 11 | ∞ | 26.50 | 1.52607 | 56.0 |
| 12 | ∞ | 0.50 | | |
| 13* | 22.200 | 2.00 | 1.49200 | 57.0 |
| 14 | −18.413 | 15.00 | | |
| 15(eye point) | | | | |

TABLE 4

| Aspherical coefficients of the $2^{nd}$ surface | Aspherical coefficients of the $7^{th}$ surface |
|---|---|
| K = 6.23270 × 10$^{-1}$ | K = 1.99190 × 10$^0$ |
| A4 = −7.91390 × 10$^{-4}$ | A4 = −6.37510 × 10$^{-4}$ |
| A6 = −2.59660 × 10$^{-6}$ | A6 = −7.34780 × 10$^{-7}$ |
| Aspherical coefficients of the $3^{rd}$ surface | Aspherical coefficients of the $13^{th}$ surface |
| K = −9.32370 × 10$^{-1}$ | K = −2.49850 × 10$^{-1}$ |
| A4 = −4.20940 × 10$^{-4}$ | A4 = −8.24700 × 10$^{-5}$ |
| A6 = 4.23570 × 10$^{-6}$ | A6 = 1.12830 × 10$^{-6}$ |
| | A8 = −1.59220 × 10$^{-8}$ |

The objective lens is composed of the first biconcave negative lens L1, the second biconvex positive lens L2, the third biconcave negative lens L3, and the fourth positive lens L4 having the meniscus shape with the convex surface facing the pupil side, and an image through the objective lens is formed in the vicinity of the incident surface of a condenser lens L5. Further, when the magnification is changed from the wide angle end to the telephoto end, L1 and L4 are fixed, L2 is monotonously moved to the object side, and L3 is reciprocated. The lens L2 bears a most part of the magnification operation, and L3 bears mainly the image plane correction. L6 is an eyepiece, F is a field diaphragm and EP is an eye point. The image erecting member is composed of a roof mirror RM (not shown) located between L4 and L5 and a prism P2.

EXAMPLE 3

Figure 5A:
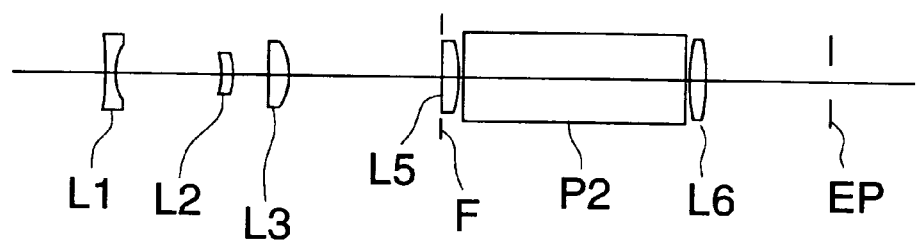
FIGS. 5(a), 5(b), and 5(c) are sectional views of a real image type zoom finder of Example 3.
Figure 5B:
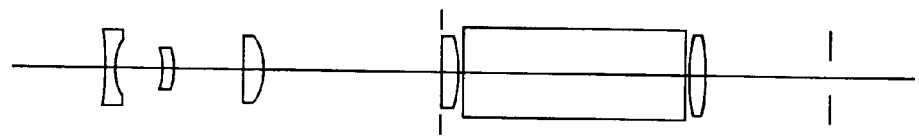
Figure 5C:
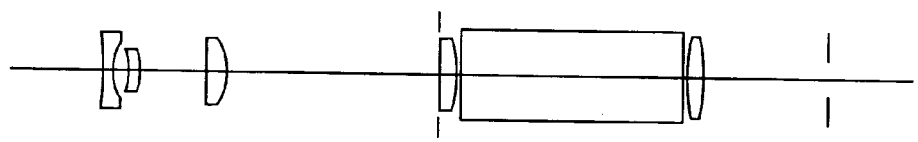

Table 5 and Table 6 are lens data of Example 3, FIGS. 5(a), 5(b), 5(c) respectively show a sectional view of the viewfinder at the wide angle end, medium range, and telephoto end, and FIGS. 6(a)-1 to 6(a)-3, 6(b)-1 to 6(b)-3, 6(c)-1 to 6(c)-3, are views respectively showing aberration curves at the wide angle end, medium range, and telephoto end.

ω(°): 25.6 - 19.5 - 14.5

Magnification of the viewfinder: 0.39 - 0.53 - 0.73

TABLE 5

| Surface No. | r | d | $n_d$ | $v_d$ |
|---|---|---|---|---|
| 1 | −68.331 | 1.20 | 1.58300 | 30.0 |
| 2* | 8.046 | 12.78–5.86–1.80 | | |
| 3* | −13.164 | 1.20 | 1.49200 | 57.0 |
| 4 | −9.207 | 4.52–8.35–8.28 | | |
| 5* | 42.452 | 2.20 | 1.49200 | 57.0 |
| 6 | −8.220 | 18.60–21.69–25.82 | | |
| 7 | ∞ | 1.80 | 1.49200 | 57.0 |
| 8 | −15.300 | 0.50 | | |
| 9 | ∞ | 26.50 | 1.52607 | 56.0 |
| 10 | ∞ | 0.50 | | |
| 11* | 22.200 | 2.00 | 1.49200 | 57.0 |
| 12 | −18.413 | 15.00 | | |
| 13(eye point) | | | | |

TABLE 6

| Aspherical coefficients of the $2^{nd}$ surface | Aspherical coefficients of the $5^{th}$ surface |
|---|---|
| K = 1.56340 × 10$^{-2}$ | K = −3.07030 × 10$^{-4}$ |
| A4 = −8.92490 × 10$^{-5}$ | A4 = −2.68790 × 10$^{-4}$ |
| A6 = −4.11480 × 10$^{-5}$ | A6 = 5.40770 × 10$^{-6}$ |
| A8 = 3.34040 × 10$^{-6}$ | A8 = −2.16150 × 10$^{-7}$ |
| Aspherical coefficients of the $3^{rd}$ surface | Aspherical coefficients of the $11^{th}$ surface |
| K = 1.72000 × 10$^{-2}$ | K = −2.49850 × 10$^{-1}$ |
| A4 = −6.88420 × 10$^{-4}$ | A4 = −8.24700 × 10$^{-5}$ |
| A6 = 7.93320 × 10$^{-6}$ | A6 = 1.12830 × 10$^{-6}$ |
| A8 = 4.35030 × 10$^{-6}$ | A8 = −1.59220 × 10$^{-8}$ |

The objective lens is composed of the first biconcave negative lens L1, the second positive lens L2 having the meniscus shape with the convex surface facing the pupil side, and the third biconcave positive lens L3, and an image through the objective lens is formed in the vicinity of the incident surface of a condenser lens L5. Further, when the magnification is changed from the wide angle end to the telephoto end, L1 is fixed, and L2 and L3 are monotonously moved to the object side. The lens L3 bears a most part of the magnification operation, and L2 bears mainly the image plane correction. L6 is an eyepiece, F is a field diaphragm and EP is an eye point. The image erecting member is composed of a roof mirror RM (not shown) located between L3 and L5, and a prism P2.

EXAMPLE 4

Figure 9:
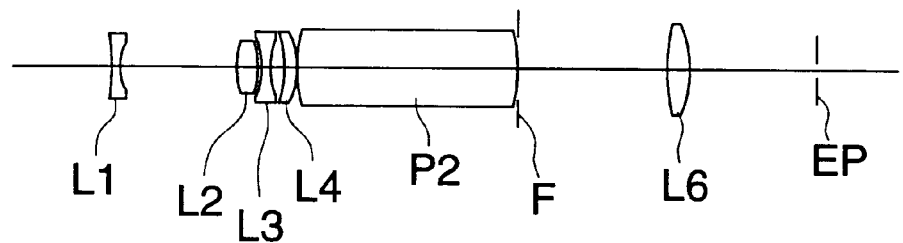
FIGS. 9(a), 9(b) and 9(c) are sectional views of the real image type zoom finder of Example 4.
Figure 9:
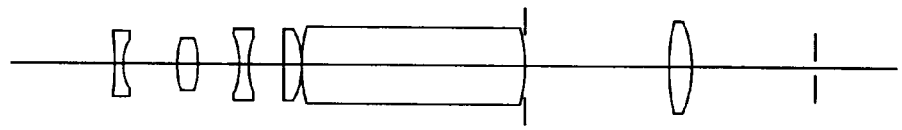
Figure 9:
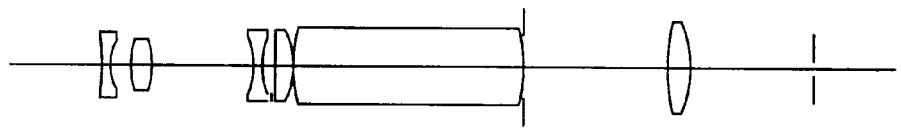
Figures 1, 2, 3, 10A:
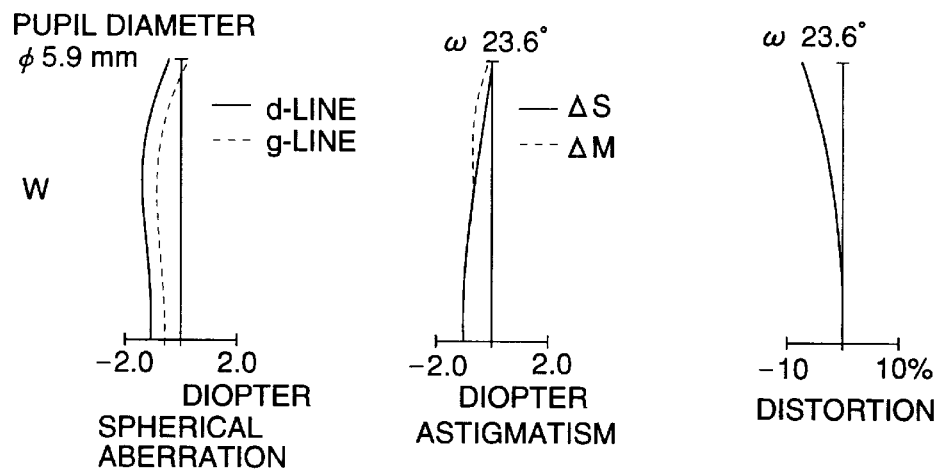
Figures 1, 2, 3, 10B:
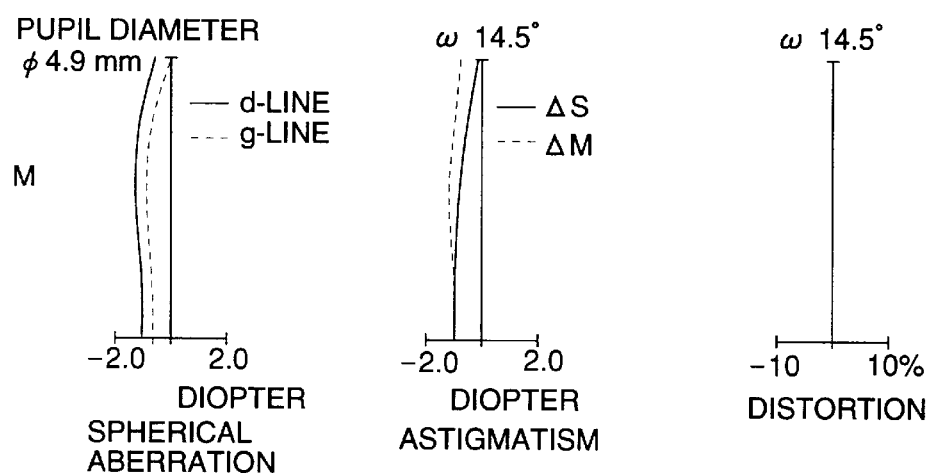
Figures 1, 2, 3, 10C:
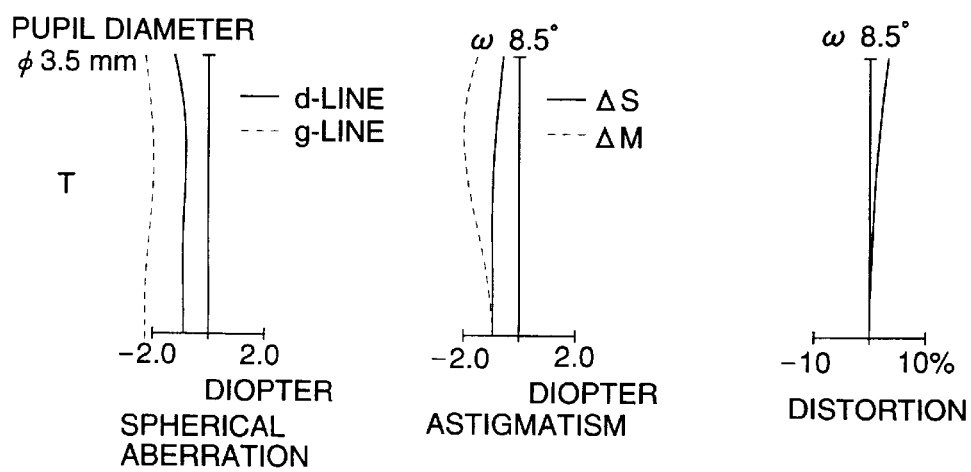

Table 7 and Table 8 are lens data of Example 4, FIGS. 9(a), 9(b), 9(c) respectively show a sectional view of the viewfinder at the wide angle end, medium range, and telephoto end, and FIGS. 10(a)-1 to 10(c)-3 are views respectively showing aberration curves at the wide angle end, medium range, and telephoto end.

ω(°): 23.6 - 14.5 - 8.5

Magnification of the viewfinder: 0.47 - 0.78 - 1.37

TABLE 7

| Surface No. | r | d | $n_d$ | $v_d$ |
|---|---|---|---|---|
| 1 | −25.473 | 1.20 | 1.58300 | 30.0 |
| 2* | 11.693 | 14.20–6.50–2.22 | | |

TABLE 7-continued

| Surface No. | r | d | $n_d$ | $v_d$ |
|---|---|---|---|---|
| 3* | 8.786 | 2.40 | 1.49200 | 57.0 |
| 4 | −11.550 | 0.50–4.98–12.49 | | |
| 5 | −26.174 | 1.20 | 1.58300 | 30.0 |
| 6* | 10.813 | 1.50–4.72–1.50 | | |
| 7 | −49.071 | 1.80 | 1.49200 | 57.0 |
| 8* | −11.648 | 0.20 | | |
| 9 | 15.544 | 26.50 | 1.52607 | 56.0 |
| 10 | −18.400 | 18.21 | | |
| 11* | 20.104 | 2.51 | 1.49200 | 57.0 |
| 12 | −17.611 | 15.00 | | |
| 13(eye point) | | | | |

TABLE 8

| Aspherical coefficients of the $2^{nd}$ surface | The 8th surface aspherical coefficient |
|---|---|
| K = −3.91880 × $10^{-2}$<br>A4 = −3.46700 × $10^{-4}$<br>A6 = 2.41910 × $10^{-5}$<br>A8 = −8.93110 × $10^{-7}$ | K = −3.22650 × $10^{-1}$<br>A4 = 1.06420 × $10^{-4}$<br>A6 = −7.47180 × $10^{-6}$<br>A8 = 3.05740 × $10^{-7}$ |
| Aspherical coefficients of the $3^{rd}$ surface | Aspherical coefficients of the $11^{th}$ surface |
| K = −7.10640 × $10^{-1}$<br>A4 = −4.73470 × $10^{-4}$<br>A6 = 1.01210 × $10^{-5}$<br>A8 = −2.92030 × $10^{-7}$ | K = −3.07540 × $10^{-2}$<br>A4 = −7.66920 × $10^{-5}$<br>A6 = −1.40860 × $10^{-7}$<br>A8 = 2.13570 × $10^{-9}$ |
| Aspherical coefficients of the $6^{th}$ surface | |
| K = 4.03860 × $10^{-1}$<br>A4 = −1.35390 × $10^{-4}$<br>A6 = −1.18770 × $10^{-5}$<br>A8 = 5.48920 × $10^{-7}$ | |

The objective lens is composed of the first biconcave negative lens L1, the second biconvex positive lens L2, the third biconcave negative lens L3, and the fourth positive lens L4 having the meniscus shape with the convex surface facing the pupil side, and an image through the objective lens is formed in the vicinity of the surface of emergence of a prism P2. The incident surface of P2 is structured by the spherical surface so that it bears a portion of positive refractive power together with L4, and its surface of emergence carries out also the role of a condenser lens. Further, when the magnification is changed from the wide angle end to the telephoto end, L1 and L4 are fixed, L2 is monotonously moved to the object side, and L3 is reciprocated. The lens L2 bears a most part of the magnification operation, and L3 bears mainly the image plane correction. L6 is an eyepiece, F is a field diaphragm and EP is an eye point. The image erecting member is composed of the prism P2 having 2 reflection surfaces and a roof mirror RM (not shown) located between P2 and L6.

EXAMPLE 5

Figure 11:
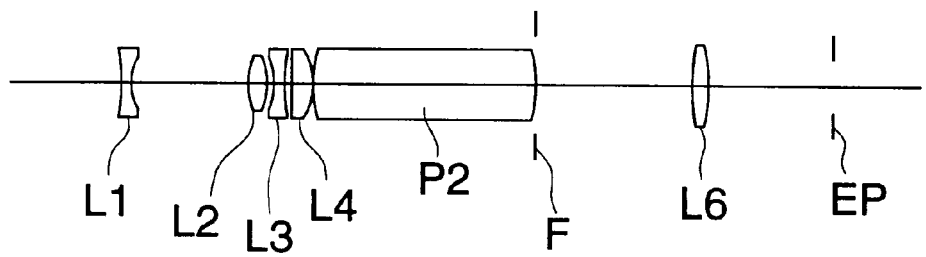
FIGS. 11(a), 11(b) and 11(c) are sectional views of the real image type zoom finder of Example 5.
Figure 11:
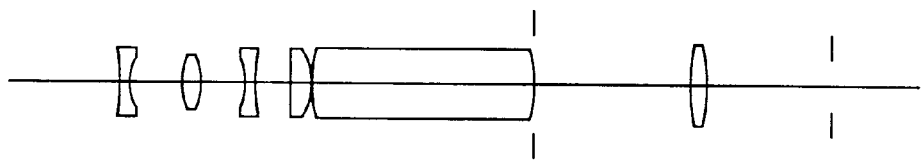
Figure 11:
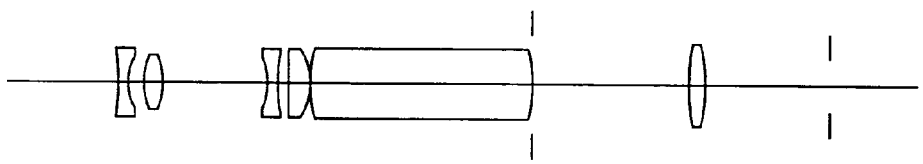
Figure 12:
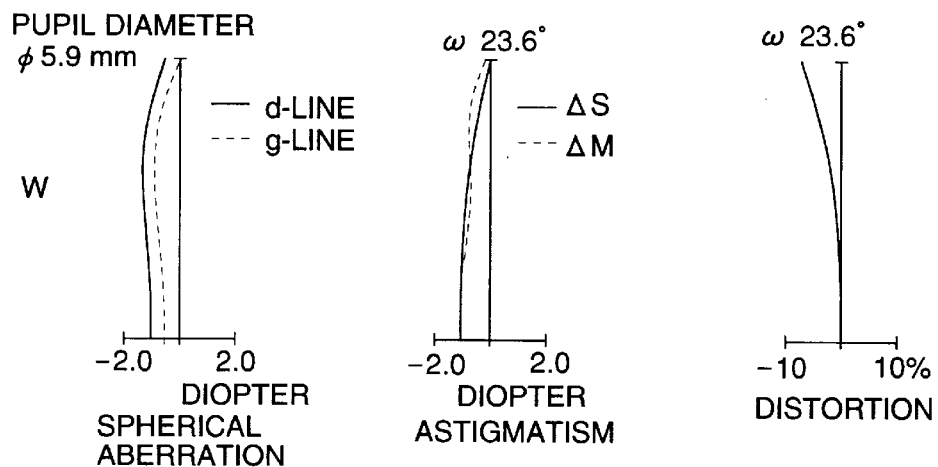
Figure 12:
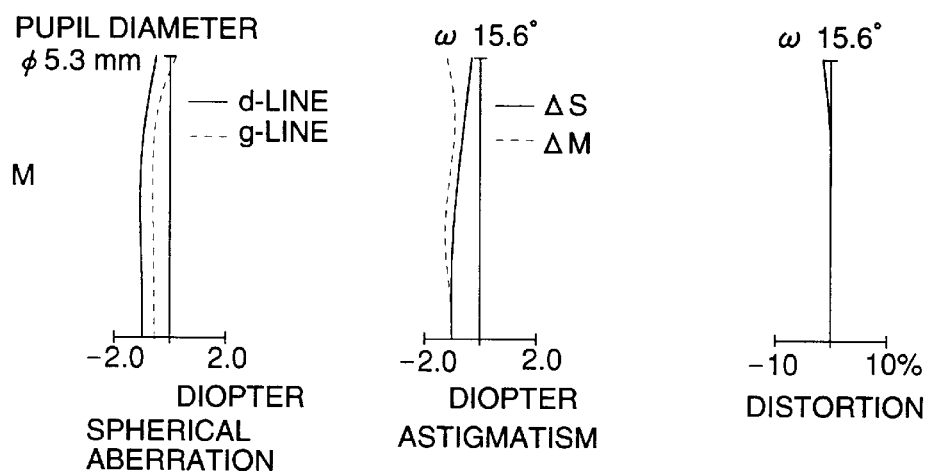
Figure 12:
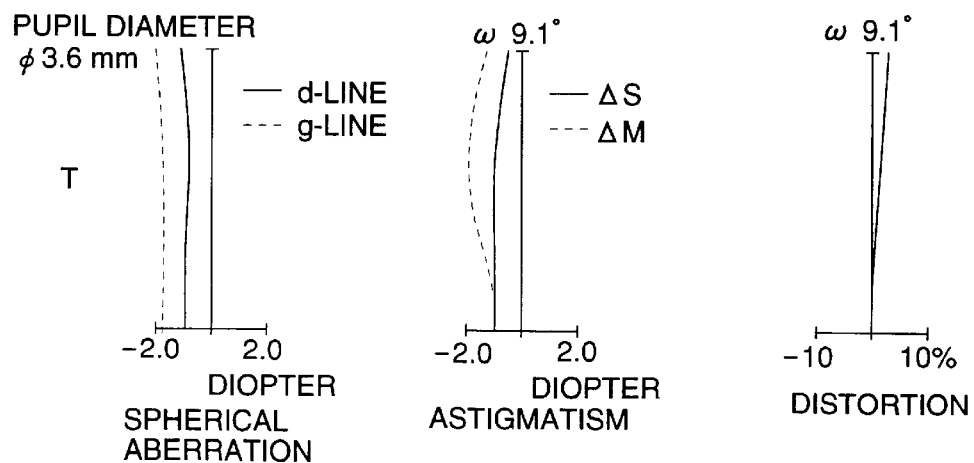

Table 9 and Table 10 are lens data of Example 5, FIGS. 11(a), 11(b), 11(c) respectively show a sectional view of the viewfinder at the wide angle end, medium range, and telephoto end, and FIGS. 12(a)-1 to 12(c)-3 are views respectively showing aberration curves at the wide angle end, medium range, and telephoto end.

ω(°): 23.6 − 15.6 − 9.1

Magnification of the viewfinder: 0.46 − 0.72 − 1.27

TABLE 9

| Surface No. | r | d | $n_d$ | $v_d$ |
|---|---|---|---|---|
| 1 | −31.228 | 1.20 | 1.58300 | 30.0 |
| 2* | 12.259 | 14.20–6.13–2.30 | | |
| 3* | 9.290 | 2.40 | 1.49200 | 57.0 |
| 4 | −12.623 | 0.50–5.07–12.40 | | |
| 5 | −19.039 | 1.20 | 1.58300 | 30.0 |
| 6* | 10.791 | 1.50–5.00–1.50 | | |
| 7 | −52.031 | 1.80 | 1.49200 | 57.0 |
| 8* | −10.034 | 0.20 | | |
| 9 | 13.236 | 26.50 | 1.52607 | 56.0 |
| 10 | −18.400 | 18.12 | | |
| 11* | 20.000 | 2.50 | 1.49200 | 57.0 |
| 12 | −17.520 | 15.00 | | |
| 13(eye point) | | | | |

TABLE 10

| Aspherical coefficients of the $2^{nd}$ surface | Aspherical coefficients of the $8^{th}$ surface |
|---|---|
| K = −3.80340 × $10^{-2}$<br>A4 = −3.00060 × $10^{-4}$<br>A6 = 2.18670 × $10^{-5}$<br>A8 = −7.71190 × $10^{-7}$ | K = −3.32610 × $10^{-1}$<br>A4 = 8.41200 × $10^{-5}$<br>A6 = −9.77840 × $10^{-6}$<br>A8 = 4.02480 × $10^{-7}$ |
| Aspherical coefficients of the $3^{rd}$ surface | Aspherical coefficients of the $11^{th}$ surface |
| K = −7.04240 × $10^{-1}$<br>A4 = −3.74120 × $10^{-4}$<br>A6 = 5.85370 × $10^{-6}$<br>A8 = −7.60000 × $10^{-8}$ | K = −3.07540 × $10^{-2}$<br>A4 = −7.78910 × $10^{-5}$<br>A6 = −1.44550 × $10^{-7}$<br>A8 = 2.21440 × $10^{-9}$ |
| Aspherical coefficients of the $6^{th}$ surface | |
| K = 4.02800 × $10^{-1}$<br>A4 = −1.30880 × $10^{-4}$<br>A6 = −1.55000 × $10^{-5}$<br>A8 = 6.66420 × $10^{-7}$ | |

The objective lens is composed of the first biconcave negative lens L1, the second biconvex positive lens L2, the third biconcave negative lens L3, and the fourth positive lens L4 having the meniscus shape with the convex surface facing the pupil side, and an image through the objective lens is formed in the vicinity of the surface of emergence of a prism P2. The incident surface of P2 is structured by the spherical surface so that it bears a portion of positive refractive power together with L4, and its surface of emergence carries out also the role of a condenser lens. Further, when the magnification is changed from the wide angle end to the telephoto end, L1 and L4 are fixed, L2 is monotonously moved to the object side, and L3 is reciprocated. The lens L2 bears a most part of the magnification operation, and L3 bears mainly the image plane correction. L6 is an eyepiece, F is a field diaphragm and EP is an eye point. The image erecting member is composed of the prism P2 having 2 reflection surfaces and a roof mirror RM (not shown) located between P2 and L6.

EXAMPLE 6

Figure 13:
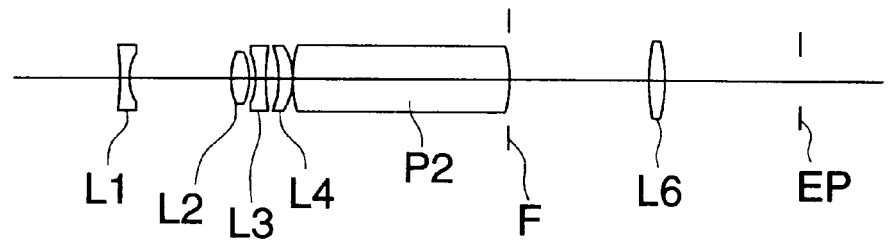
FIGS. 13(a), 13(b) and 13(c) are sectional views of the real image type zoom finder of Example 6.
Figure 13:
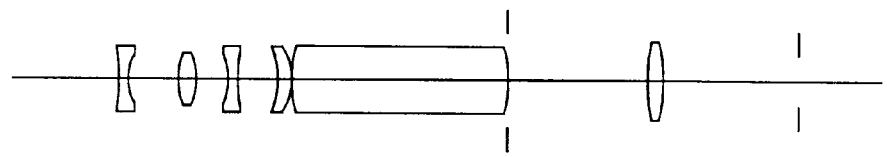
Figure 13:
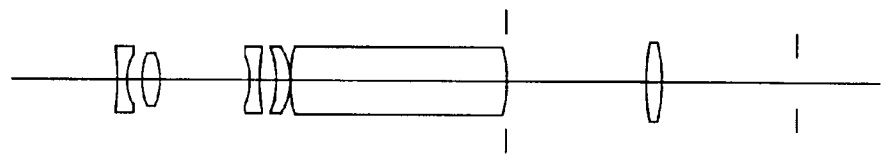
Figures 1, 2, 3, 14A:
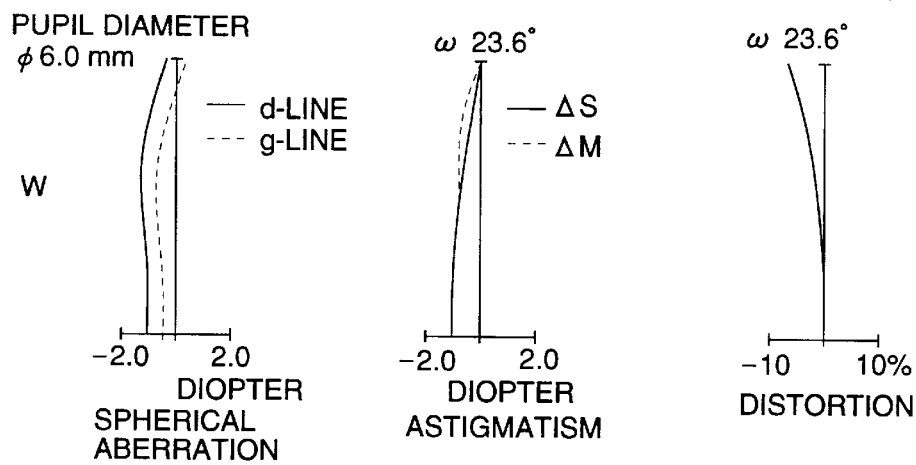
Figures 1, 2, 3, 14B:
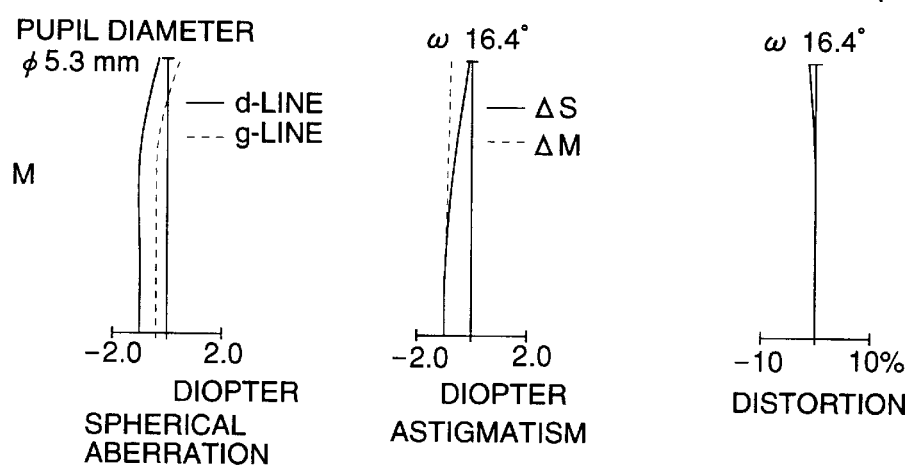
Figures 1, 2, 3, 14C:
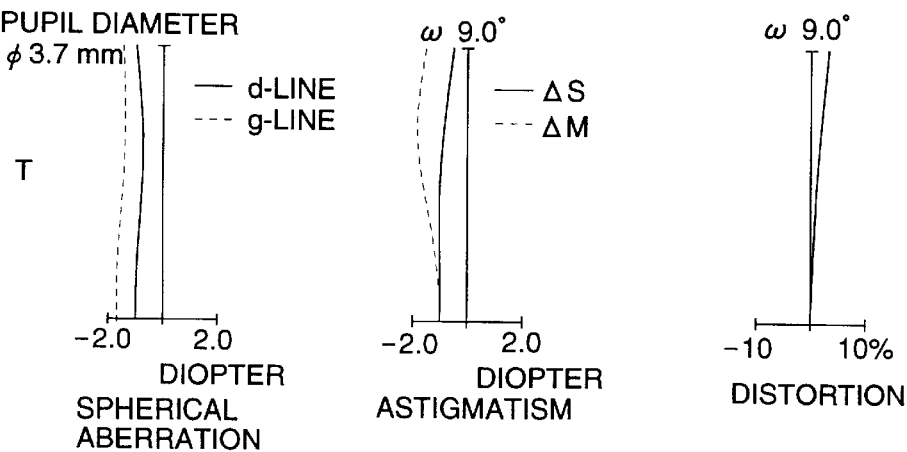

Table 11 and Table 12 are lens data of Example 6, FIGS. 13(a), 13(b), 13(c) respectively show a sectional view of the viewfinder at the wide angle end, medium range, and telephoto end, and FIGS. 14(a)-1 to 14(c)-3 are views respectively showing aberration curves at the wide angle end, medium range, and telephoto end.

ω(°): 23.6 - 16.4 - 9.0

Magnification of the viewfinder: 0.45 - 0.66 - 1.24

TABLE 11

| Surface No. | r | d | $n_d$ | $v_d$ |
|---|---|---|---|---|
| 1 | −29.204 | 1.20 | 1.58300 | 30.0 |
| 2* | 11.506 | 14.20–7.83–2.66 | | |
| 3* | 9.072 | 2.40 | 1.49200 | 57.0 |
| 4 | −12.070 | 0.50–3.95–12.03 | | |
| 5 | −18.986 | 1.20 | 1.58300 | 30.0 |
| 6* | 12.929 | 1.50–4.42–1.50 | | |
| 7 | −14.817 | 1.80 | 1.49200 | 57.0 |
| 8* | −7.819 | 0.20 | | |
| 9 | 13.850 | 26.50 | 1.52607 | 56.0 |
| 10 | −18.400 | 18.12 | | |
| 11* | 20.000 | 2.50 | 1.49200 | 57.0 |
| 12 | −17.520 | 15.00 | | |
| 13(eye point) | | | | |

TABLE 12

| Aspherical coefficients of the 2$^{nd}$ surface | Aspherical coefficients of the 8$^{th}$ surface |
|---|---|
| K = 7.00080 × 10$^{-4}$ | K = −1.11120 × 10$^{-5}$ |
| A4 = −3.29990 × 10$^{-4}$ | A4 = 1.38600 × 10$^{-4}$ |
| A6 = 2.39290 × 10$^{-5}$ | A6 = −2.75050 × 10$^{-6}$ |
| A8 = −1.09940 × 10$^{-6}$ | A8 = 2.96230 × 10$^{-7}$ |
| Aspherical coefficients of the 3$^{rd}$ surface | Aspherical coefficients of the 11$^{th}$ surface |
| K = −4.00810 × 10$^{-4}$ | K = −1.21570 × 10$^{-1}$ |
| A4 = −5.14940 × 10$^{-4}$ | A4 = −8.10140 × 10$^{-5}$ |
| A6 = 3.74140 × 10$^{-6}$ | A6 = 9.87820 × 10$^{-8}$ |
| A8 = −6.12130 × 10$^{-8}$ | |
| Aspherical coefficients of the 6$^{th}$ surface | |
| K = 4.93830 × 10$^{-5}$ | |
| A4 = 3.10340 × 10$^{-5}$ | |
| A6 = −2.06010 × 10$^{-5}$ | |
| A8 = 7.95350 × 10$^{-7}$ | |

The objective lens is composed of the first biconcave negative lens L1, the second biconvex positive lens L2, the third biconcave negative lens L3, and the fourth positive lens L4 having the meniscus shape with the convex surface facing the pupil side, and an image through the objective lens is formed in the vicinity of the surface of emergence of a prism P2. The incident surface of P2 is structured by the spherical surface so that it bears a portion of positive refractive power together with L4, and its surface of emergence carries out also the role of a condenser lens. Further, when the magnification is changed from the wide angle end to the telephoto end, L1 and L4 are fixed, L2 is monotonously moved to the object side, and L3 is reciprocated. The lens L2 bears a most part of the magnification operation, and L3 mainly carries out the image plane correction. L6 is an eyepiece, F is a field diaphragm and EP is an eye point. The image erecting member is composed of the prism P2 having 2 reflection surfaces and a roof mirror RM (not shown) located between P2 and L6.

EXAMPLE 7

Figure 15:
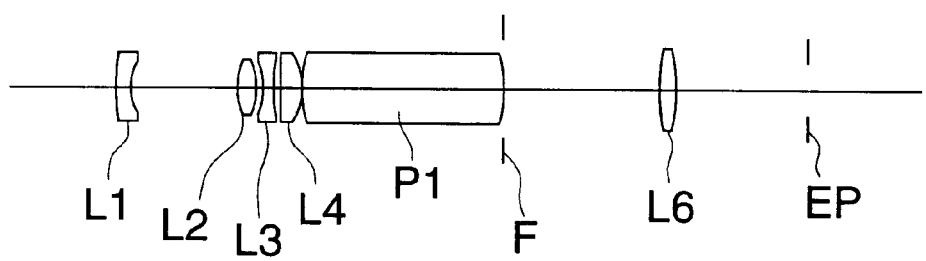
FIGS. 15(a), 15(b) and 15(c) are sectional views of the real image type zoom finder of Example 7.
Figure 15:
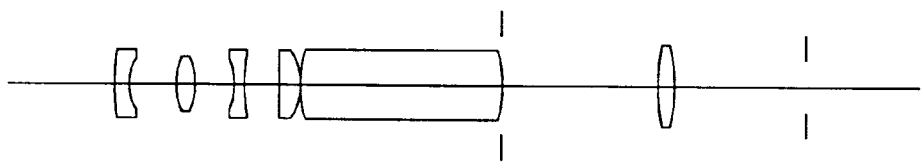
Figure 15:
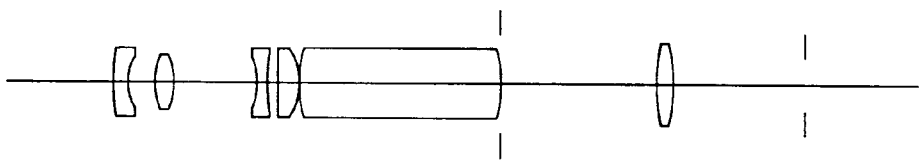
Figures 1, 2, 3, 16A:
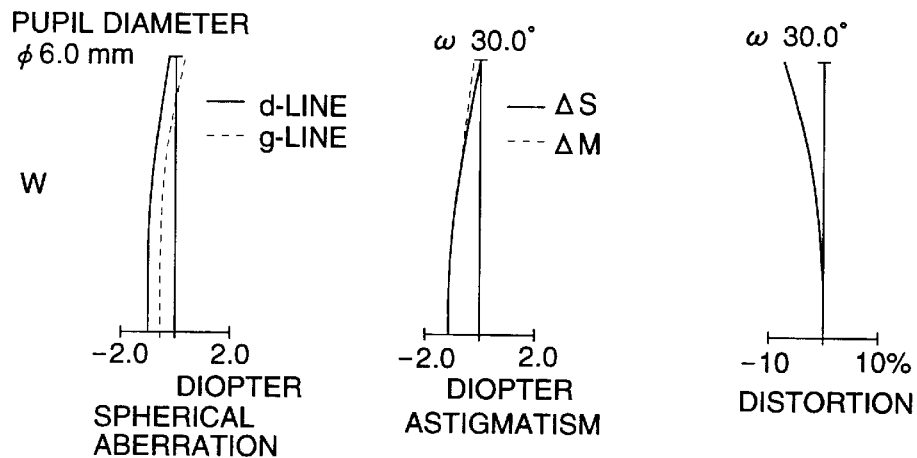
Figures 1, 2, 3, 16B:
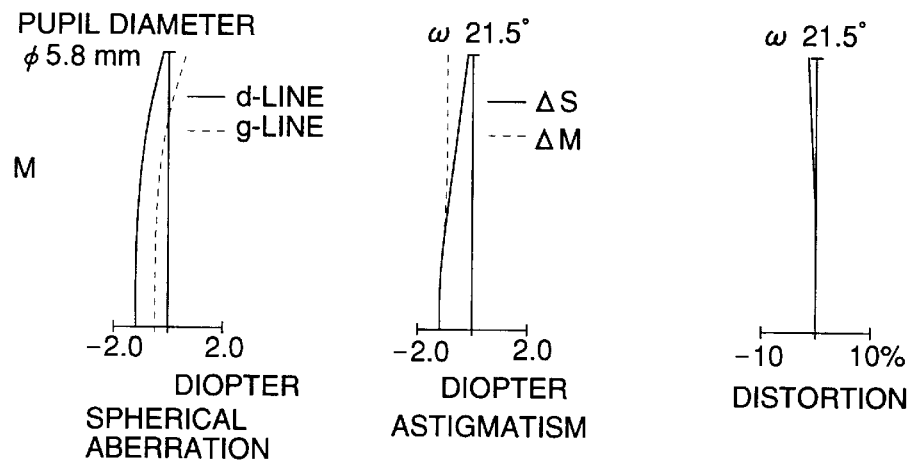
Figures 1, 2, 3, 16C:
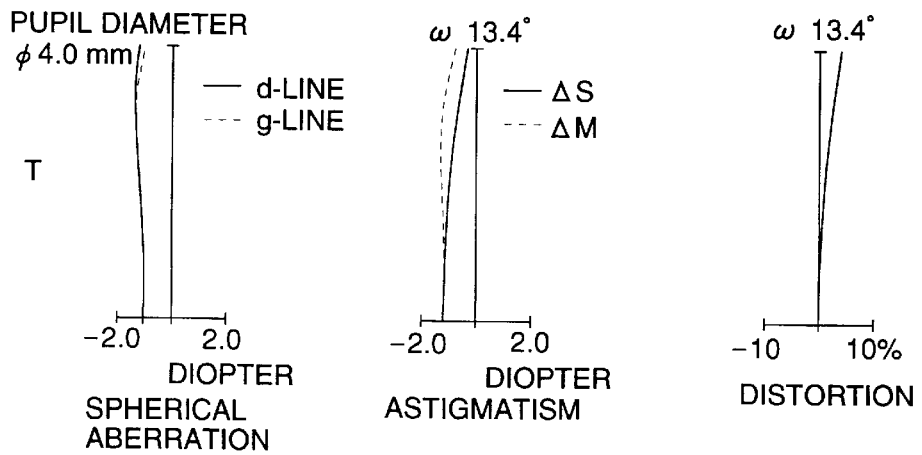

Table 13 and Table 14 are lens data of Example 7, FIGS. 15(a), 15(b), 15(c) respectively show a sectional view of the viewfinder at the wide angle end, medium range, and telephoto end, and FIGS. 16(a)-1 to 16(c)-3 are views respectively showing aberration curves at the wide angle end, medium range, and telephoto end.

ω(°): 30.0 - 21.5 - 13.4

Magnification of the viewfinder: 0.36 - 0.53 - 0.87

TABLE 13

| Surface No. | r | d | $n_d$ | $v_d$ |
|---|---|---|---|---|
| 1 | −118.470 | 1.20 | 1.58300 | 30.0 |
| 2* | 5.950 | 13.20–6.62–4.38 | | |
| 3* | 8.372 | 2.40 | 1.49200 | 57.0 |
| 4 | 9.938 | 0.50–4.24–9.32 | | |
| 5 | −13.417 | 1.20 | 1.58300 | 30.0 |
| 6* | 8.828 | 1.30–4.14–1.30 | | |
| 7 | 120.610 | 2.20 | 1.49200 | 57.0 |
| 8* | −9.139 | 0.20 | | |
| 9 | 13.000 | 24.50 | 1.52607 | 56.0 |
| 10 | −19.200 | 18.60 | | |
| 11* | 21.200 | 2.50 | 1.49200 | 57.0 |
| 12 | −17.538 | 15.00 | | |
| 13(eye point) | | | | |

TABLE 14

| Aspherical coefficients of the 2$^{nd}$ surface | Aspherical coefficients of the 8$^{th}$ surface |
|---|---|
| K = −2.00530 × 10$^{-1}$ | K = −3.34340 × 10$^{-1}$ |
| A4 = −3.78030 × 10$^{-4}$ | A4 = 5.55230 × 10$^{-5}$ |
| A6 = 1.05510 × 10$^{-5}$ | A6 = 1.10740 × 10$^{-8}$ |
| Aspherical coefficients of the 3$^{rd}$ surface | Aspherical coefficients of the 11$^{th}$ surface |
| K = −8.59150 × 10$^{-2}$ | K = −3.74610 × 10$^{-2}$ |
| A4 = −5.76590 × 10$^{-4}$ | A4 = −8.19560 × 10$^{-5}$ |
| A6 = 7.00150 × 10$^{-6}$ | A6 = 2.62540 × 10$^{-7}$ |
| Aspherical coefficients of the 6$^{th}$ surface | |
| K = 7.39740 × 10$^{-2}$ | |
| A4 = −3.45800 × 10$^{-4}$ | |
| A6 = 1.09500 × 10$^{-6}$ | |

The objective lens is composed of the first negative lens L1 having the meniscus shape with the convex surface facing the object side, the second biconvex positive lens L2, the third biconcave negative lens L3, and the fourth biconvex positive lens L4, and an image through the objective lens is formed in the vicinity of the surface of emergence of a prism P1. The incident surface of P1 is structured by the spherical surface so that it bears a portion of positive refractive power together with L4, and its surface of emergence carries out also the role of a condenser lens. Further, when the magnification is changed from the wide angle end to the telephoto end, L1 and L4 are fixed, L2 is monotonously moved to the object side, and L3 is reciprocated. The lens L2 bears a most part of the magnification operation, and L3 mainly carries out the image plane correction. L6 is an eyepiece, F is a field diaphragm and EP is an eye point. The image erecting member is composed of the prism P1 having 3 reflection surfaces and a reflection mirror (not shown) located between P1 and L6.

In this connection, all of lenses and prisms of Examples of the present invention are formed of plastic materials. Of course, those may be formed of inorganic glass, or a part of them may be formed of inorganic glass and the remainder may be formed of plastic materials.

The values of each Example corresponding to the conditional relationships (1) to (4) are shown in Table 15.

TABLE 15

|     | Example 1 | Example 2 | Example 3 | Example 4 | Example 5 | Example 6 | Example 7 |
| --- | --- | --- | --- | --- | --- | --- | --- |
| (1) | 2.06 | 2.40 | 2.39 | 1.95 | 1.96 | 2.02 | 2.28 |
| (2) | 1.24 | 1.22 | 1.58 | 1.51 | 1.67 | 1.61 | 1.51 |
| (2)" | 2.23 | 2.16 | 2.92 | — | — | — | — |
| (3) | 2.26 | 2.85 | 2.81 | 2.53 | 2.55 | 2.62 | 3.08 |
| (4) | 0.96 | 1.25 | — | 1.23 | 1.03 | 1.19 | 0.93 |

Figure 7:
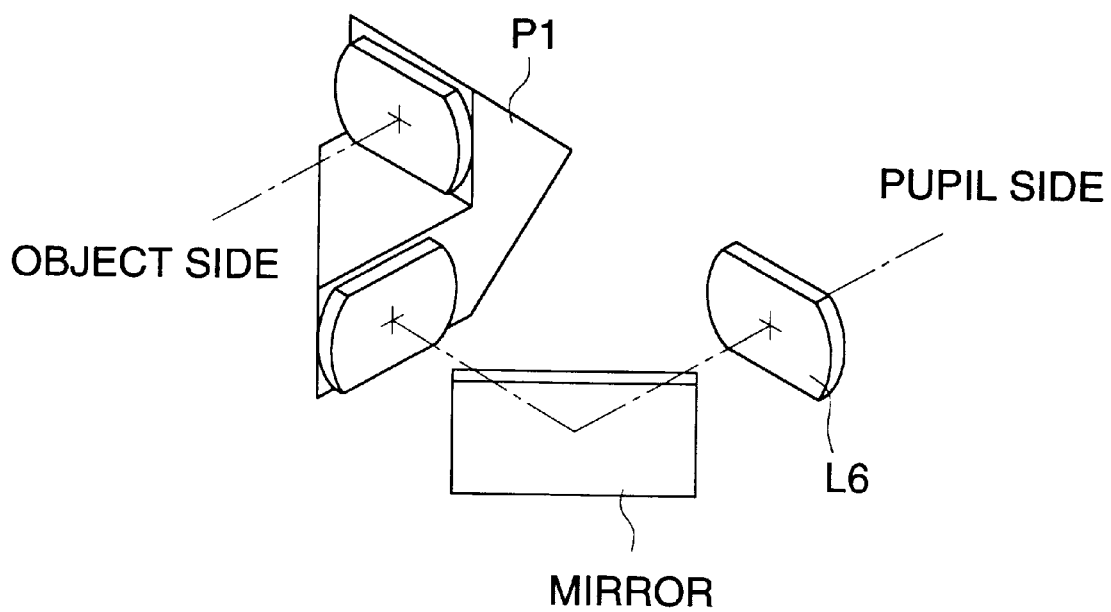
FIG. 7 is a view showing a structure of the image erecting member of Examples 1 and 7.

Incidentally, in the structure of an image erecting member used in each Example, the structure of the image erecting member in Example 1 and Example 7 is Porro type. However, P1 has 3 reflecting surfaces of the $1^{st}$ to $3^{rd}$ reflecting surface as shown in FIG. 7, and the $4^{th}$ reflecting surface is structured by a mirror. In this type of image erecting member, the thickness of the image erecting member located on the pupil side of the objective lens can be more suppressed, as compared to that of a type using a roof mirror. An object to arrange a field diaphragm (not shown in FIG. 7) between the $3^{rd}$ reflecting surface and the $4^{th}$ reflecting surface is as follows: when a field diaphragm size switching mechanism is required, a space for refuge of parts obstructing a field of view can be easily obtained in the direction of the optical axis of the objective lens, and it is advantageous to size reduction of the overall finder unit. Such the structure of the image erecting member can be realized in a viewfinder having an objective lens in which a back focal length is long, of the present invention.

Figure 8:
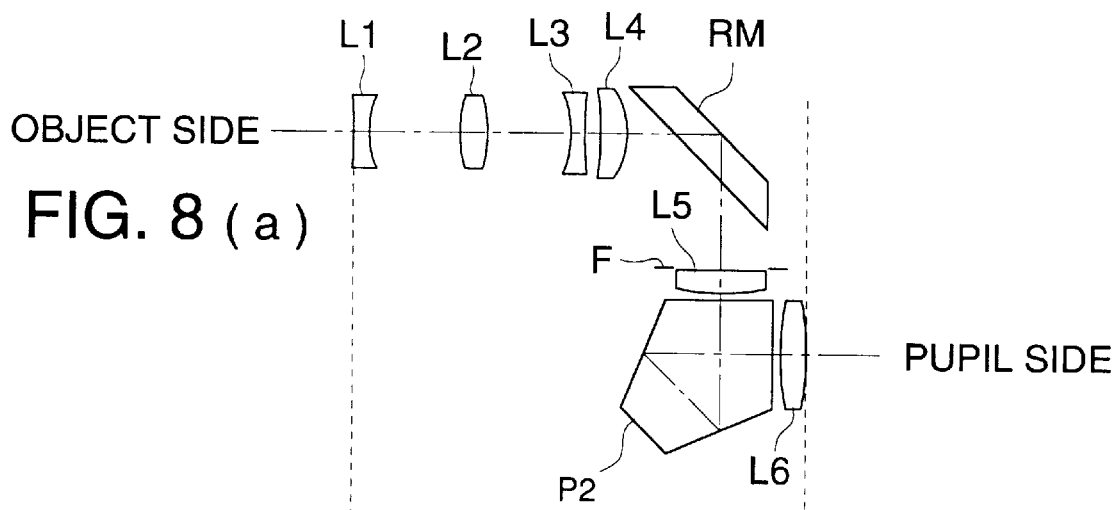
FIGS. 8(a) and 8(b) are views showing the structure of the image erecting member of Examples 2 and 3.
Figure 8:
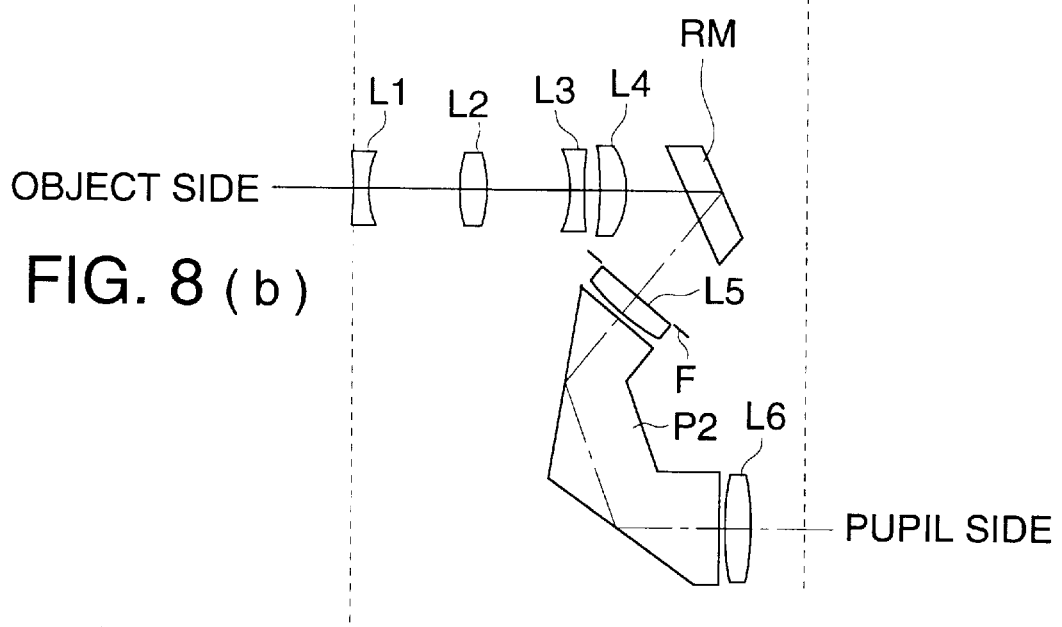

In Examples 2 and 3, the structure by a roof mirror and a pentagonal prism as shown in FIG. 8(a), is common. It is a structure which can suppress the height of the camera main body to be small when the viewfinder is assembled in the camera main body. Further, in order to suppress a size of the overall finder to be small in the direction of the depth of the camera, a structure is preferable in which principal ray of the axial flux of light entering along the optical axis of the objective lens are reflected with an acute angle by a roof mirror, as shown in FIG. 8(b). As a reflection angle, setting of approximately 45°–70° is appropriate. In the structure of the image erecting member after the roof mirror, FIG. 8(b) shows an example in which a prism having 2 reflection surfaces is used, however, a structure using a pentagonal prism may also be allowable. In the case where the roof mirror arrangement is applied as shown in FIG. 8(b), when a space for arrangement of lens holding members located in the vicinity of the field diaphragm, or a space for arrangement required when the field diaphragm size switching mechanism is needed, is considered, the viewfinder, having an objective lens in which the back focal length is long, of the present invention is necessary.

Figure 17:
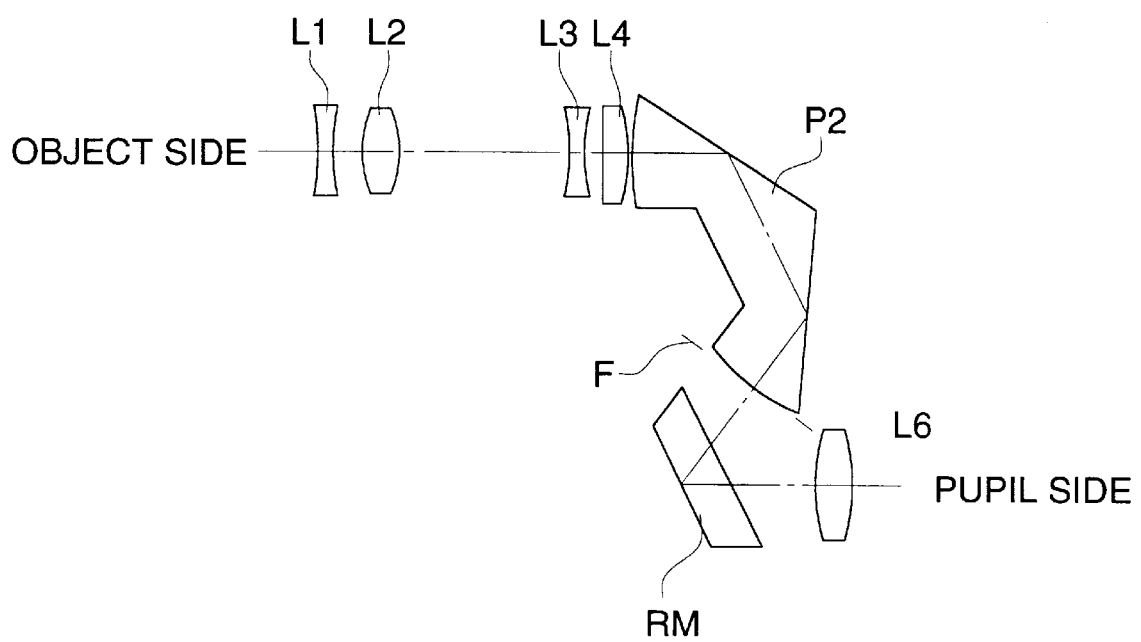
FIG. 17 is a view showing the structure of the image erecting member of Examples 4, 5, 6.

The image erecting member of Examples 4, 5 and 6 is structured as shown in FIG. 17. When it is not necessary to suppress a size of the overall finder to be small in the direction of the depth of the camera, such the structure can also be realized.

Incidentally, a phrase of "when the field diaphragm size switching mechanism is needed" used in the above description corresponds to, for example, a case of a viewfinder used in a camera in which an aspect ratio of a size of a photographic image plane can be changed, or similar cases. The values of the focal lengths of the whole objective lens system and the focal length of the first lens (group) of the objective lens system for each of Examples 1–7 are:

| Ex. 1 | Ex. 2 | Ex. 3 | Ex. 4 | Ex. 5 | Ex. 6 | Ex. 7 |
| --- | --- | --- | --- | --- | --- | --- |
| 8.04 | 7.71 | 7.79 | 9.00 | 8.95 | 8.70 | 7.14 |
| 14.48 | 13.70 | 14.42 | 26.57 | 24.63 | 23.94 | 17.28 |
| 9.95 | 9.38 | 12.28 | 13.58 | 14.95 | 14.01 | 10.79 | where $f_W$ is the focal length of the whole objective lens systems at its wide angle end position, $f_t$ is the focal length of the whole objective lens systems at its telephoto end position, and $f_1$ is the focal length of the first lens (group).

Further, in the image erecting member of the present invention, the reflecting element composed of a mirror can be replaced with a prism, or the reflecting element composed of a prism can also be replaced with a mirror.

According to the present invention, a real image type zoom finder in which a large back focal length of the objective lens can be obtained, is provided, while a relatively large magnification ratio of a viewfinder is maintained at the wide angle end.

The disclosed embodiment can be varied by a skilled person without departing from the spirit and scope of the invention.

What is claimed is:

1. A real image type zoom finder comprising:
   (a) an objective lens including a plurality of lenses and having a positive refracting power;
   (b) a field diaphragm provided in a vicinity of a focal point of the objective lens, for defining a viewing field;
   (c) a structure for erecting an image formed by the objective lens; and
   (d) an eyepiece having a positive refracting power for enlarging an image formed by the objective lens and the field diaphragm,
   wherein said objective lens includes at least a first lens group provided closest to an object side, having a negative refracting power, and satisfies the following conditions:

$1.9 < f_B/f_W$ and $1.0 < |f_1|/f_W < 2.0$ where $f_B$ is a minimum value of a distance between a surface of the object lens closest to a pupil side and the field diaphragm, which is equivalent to a corresponding air distance, $f_1$ is a focal length of said first lens group, and $f_W$ is a focal length at a wide angle end of said objective lens,
   wherein said objective lens comprises, from the object side:
   said first lens group consisting of a single lens;
   a second lens group having a positive refracting power;
   a third lens group having a negative refracting power; and
   a fourth lens group having a positive refracting power,
   wherein when magnification is varied between the wide angle end and a telephoto end, the second and third lens groups move along an axis of said objective lens while a distance on the axis between the second lens group and the third lens group is varied.

2. The real image type zoom finder of claim 1, wherein said first lens group is a first lens having a negative refracting power;

said second lens group comprises a second lens having a biconvex shaped positive refracting power;

said third lens group comprises a third lens having a negative refracting power; and said fourth lens group comprises a fourth lens having a positive refracting power.

3. The real image type zoom finder of claim 1, wherein said image structure includes a first reflecting element between the objective lens and the field diaphragm, having three reflecting surfaces, and a second reflecting element between the field diaphragm and the eyepiece, having a reflecting surface.

4. The real image type zoom finder of claim 1, wherein said image erecting structure includes a first reflecting element between said objective lens and said field diaphragm, having a roof surface, and a second reflecting element between said field diaphragm and said eyepiece, having two reflecting surfaces, and wherein the first reflecting element is disposed so that an on-axis incident ray incident along an axis of said objective lens makes an acute angle with a reflected ray of the on-axis incident ray.

* * * * *